United States Patent Office 3,440,193
Patented Apr. 22, 1969

3,440,193
OIL-MODIFIED ALKYD EMULSION COATINGS
Philip J. Campagna, Williamsville, N.Y., assignor to Allied Chemical Corporation, New York, N.Y., a corporation of New York
No Drawing. Filed May 6, 1965, Ser. No. 453,835
Int. Cl. C08g *17/16, 53/18;* C09d *3/68*
U.S. Cl. 260—22
19 Claims

ABSTRACT OF THE DISCLOSURE

This invention relates to coating compositions which are air-drying aqueous emulsions of oil-modified alkyd resins containing an emulsifying agent selected from the group consisting of nonylphenol-ethylene oxide condensate having an average of at least about 30 mols of ethylene oxide,
dinonylphenol-ethylene oxide condensate having an average of at least about 30 mols of ethylene oxide, and
octylphenol-ethylene oxide condensate having an average of at least about 20 mols of ethylene oxide.

---

Air-drying oil-modified alkyd resins dissolved in volatile organic solvents, such as xylene and petroleum distillates, have been widely used in decorative and protective coating compositions. Such solvent-based coating compositions are advantageous in that they are relatively inexpensive, simple to apply and do not deteriorate rapidly while in storage. Films formed from such coating compositions are tough, attractive and resistant to water.

A disadvantage of the solvent-based coating compositions is that they are recognized health and fire hazards, due to the presence of the volatile organic solvents which are inherently toxic and combustible.

There has been a continuing interest in the coatings industry in developing water-based coating compositions having the desirable properties of the solvent-based coating compositions, while avoiding the use of the hazardous volatile organic solvents.

Coating compositions have been produced comprising aqueous emulsions of alkyd resins stabilized with a protective colloid, such as casein, glue, gum arabic, starch or cellulosic derivatives. Such coating compositions have been found to be unsatisfactory since the protective colloids are, more or less, subject to attack by various microbes and fungi thus adversely affecting film properties. Furthermore, the protective colloids are hydrophilic and tend to reduce the water-resistance of films formed from such coating compositions, thus precluding use on outdoor surfaces exposed to weather or indoor surfaces likely to be exposed to water spills and washings.

Accordingly, it is an object of this invention to provide an air-drying water-based coating composition useful for forming films which are tough, highly resistant to water, attractive in appearance and not readily attacked by microbs or fungi.

Another object of this invention is to provide an air-drying water-based coating composition which is suitable for storage over an extended period of time and is resistant to separation into aqueous and organic phases on freezing.

Another object of this invention is to provide an air-drying water-based coating composition which forms a film which dries to the touch within 8 hours.

These and other objects and advantages will become apparent from the following detailed description.

It has now been discovered that air-drying water-based coating compositions having film properties comparable to organic solvent-based oil-modified alkyd resin-containing coating compositions can be prepared by forming novel aqueous emulsions containing certain oil-modified alkyd resins, in combination with certain nonionic emulsifying agents, as will herein later be described. The resulting air-drying water-based coating compositions form films which are tough, highly resistant to water, attractive in appearance and not readily attacked by microbes and/or fungi. In addition, these coating compositions are highly stable and suitable for storage over extended periods of time.

These desirable results are surprising since the oil-modified alkyd resins of this invention are highly hydrophobic and would not be expected to be useful in preparing highly stable emulsions, while the nonionic emulsifying agents of this invention are highly hydrophilic and would be expected to preclude formation of films of high water-resistance.

The oil-modified alkyd resins of this invention broadly comprise the reaction product of a polycarboxylic acid, fatty acids or glycerides and a polyhydric alcohol. These resins are prepared in accordance with conventional practices wherein a polycarboxylic acid and a polyhydric alcohol are heated together with free fatty acids, partial esters derived from fatty acids and polyhydric alcohols or mixtures thereof. The oil-modified alkyd resin may be formed by mixing all components at the start and heating the mixture to reaction temperature, or first reacting the free fatty acids or fatty acid glycerides with glycerol or the polyhydric alcohol to form partial esters which are then reacted with other alkyd resin components.

In preparing the alkyd resins of the present invention, it is necessary to take account of a number of factors relating either to the nature and proportion of the reactants or the extent of the reaction. The choice of the reactants used, particularly the fatty acid or glyceride, depends upon the desired grade (e.g. primer or outer coating) and the ultimate use of the final product. In formulating the alkyd resin, the main objective is to achieve maximum storage stability and fast drying of the coating compositions and water-resistance of the cured coatings. However, a change in the formulation which improves one of these properties may seriously degrade others. Therefore, an important aspect of this invention is the determination of the proportions of the reactants and the extent of the reaction which produces an optimum of these properties.

Oil-modified alkyd resins having the desirable properties, mentioned above, are formulated to have acid numbers of up to about 3.5, preferably about 1.8 to 3.5. When the esterification reaction has proceeded to a point wherein the resin has an acid number within the desired range, a fairly high viscosity is obtained. These alkyd resins of low final acid numbers are obtained by careful choice of reactants and their proportions and vigorous controlled bubbling of an inert gas through the reaction mixture toward the end of the reaction.

The oil-modified alkyd resins of this invention have a ratio of functional hydroxyl to carboxyl groups which range from about 1 to 1.2 to one; preferably about 1 to 1.1 to one. This relationship produces resins having hydroxyl numbers ranging from about 25 to 65, preferably about 30 to 45 at acid numbers of up to about 3.5.

The materials useful as oil modifiers in producing the alkyd resins of this invention are those materials composed predominantly of slow-drying constituents. The term "slow-drying" as used herein is intended to mean those materials which are capable of drying in air at moderate rates. Slow-drying glycerides which are useful include soya bean oil, cotton seed oil, fish oils, sunflower oil and mixtures thereof. In addition, many fatty acids are useful, such as the fatty acids derived from slow-drying glycerides and other fats and oils. Tall oil fatty acids are also useful. Tall oil fatty acids are obtained by refining tall oil, which is a by-product of pinewood pulping, and is composed principally of fatty acids, resin acids, sterols and high molecular weight alcohols. Tall oil fatty acids are rich in oleic acid and linoleic acid and are slow-drying. Materials which are "rapid-drying," i.e., materials which dry rapidly in air, are unsuitable as the sole oil modifier component of the alkyd resins of this invention. However, rapid-drying materials may advantageously be used as partial replacements for the slow-drying materials. Care must be exercised in the use of the rapid-drying materials as partial replacements, for while they contribute to such desirable properties as fast drying, in excess amounts they cause premature gelling and reduce storage stability. The fast-drying materials include linseed oil, tung oil and dehydrated castor oil.

Oil modifiers may be used in the form of fatty acids, glycerides, partial esters and mixtures thereof. Mixtures of different fatty acids, esters and/or partial esters thereof may be used, provided that at least a predominant portion of the oil modifier consists of slow-drying material.

The alkyd resins of this invention are produced by use of from about 50 to 80% by weight of glyceride or its equivalent free fatty acids or partial esters and preferably from about 55 to 70% by weight, based on the weight of the total alkyd resin. Alkyd resins produced from high percentages of oil modifiers are known in the art as long oil alkyd resins. The alkyd resins of this invention are therefore long oil alkyd resins.

The polycarboxylic acids useful in producing the alkyd resins of this invention are the saturated and aromatically unsaturated polycarboxylic acids and their anhydrides, where they exist, including phthalic, isophthalic, terephthalic, trimellitic, trimesic, pyromellitic, succinic, adipic, hexahydrophthalic, tetrachlorophthalic, tetrabromophthalic and the like. Unsaturated polycarboxylic acids and anhydrides, where they exist, including maleic, fumaric, tetrahydrophthalic, chlorendic and the like, may be used as partial replacements for the saturated or aromatically unsaturated polycarboxylic acid component of the alkyd resin to contribute such desirable properties as film hardness and fast drying but are unsuitable as the sole polycarboxylic acid component. Mixtures of various polycarboxylic acids, and their anhydrides, where they exist, may be utilized in adjusted proportions to contribute to certain desirable properties. The alkyd resins of this invention are produced by reaction of from about 14 to 38% by weight, of suitable polycarboxylic acid or anhydride or mixture thereof, preferably from about 16 to 30% by weight, based on the weight of the total alkyd resin.

The polyhydric alcohols useful in producing alkyd resins of this invention are compounds having 4 hydroxy groups including pentaerythritol and the like. Compounds having 2 or more hydroxy groups may be utilized as partial replacements for the compounds having 4 hydroxy groups, including ethylene, propylene, butylene and neopentyl glycols and dimers thereof and glycerol, trimethylol ethane, sorbitol, mannitol, low polymers of pentaerythritol and the like. Mixtures of polyhydric alcohols may be used to obtain certain desirable properties in the alkyd resins produced therefrom. The alkyd resins of this invention are produced by reaction of from about 8 to 25% by weight of a compound having 4 hydroxy groups and preferably from about 9 to 22% by weight, based on the weight of the total alkyd resin.

A preferred oil-modified alkyd composition is made by reacting about 300 parts by weight of soya bean oil with from about 40 to 65 parts of pentaerythritol and reacting the resultant partial ester with from about 80 to 130 parts by weight of phthalic anhydride with up to about 5 parts of maleic anhydride until an acid number not greater than about 3.5 is obtained. Another preferred composition is made by reacting about 290 parts by weight of tall oil fatty acids with from about 70 to 100 parts of pentaerythritol and from about 80 to 135 parts phthalic anhydride with up to about 1 part maleic anhydride until an acid number not greater than about 3.5 is obtained.

In either case up to 50% by weight of the soya bean oil or tall oil fatty acids may be replaced by drying oils.

The emulsifying agents of this invention are used in amounts of 5 to 9, preferably 5 to 7% by weight based on the weight of the alkyd resin.

The emulsifying agents of this invention are members of the class of materials known as nonionic emulsifying agents. Nonionic emulsifying agents, in general, are condensates of lower alkylene oxides, such as ethylene oxide and/or propylene oxide, and alkylphenols, fatty alcohols, fatty acids, fatty amines, and fatty amides. Such condensates contain at least one chain of recurring units of alkylene oxide terminating at one end in an alkylhydroxyl group and at the other in the alkylphenoxy, alkoxy, amino, or amido group denoted by the respective co-reactant.

The nonionic emulsifying agents which are suitable as the sole emulsifying agent of this invention are hereinafter referred to as "primary emulsifying agents." The primary emulsifying agents are nonylphenol-ethylene oxide condensate having an average of at least about 30 mols of ethylene oxide, dinonylphenolethylene oxide condensate having an average of at least about 30 mols of ethylene oxide and octylphenol-ethylene oxide condensates having an average of at least about 20 mols of ethylene oxide and mixtures thereof. Various other nonionic emulsifying agents may advantageously be used as partial replacements of the primary emulsifying agents, and will hereinafter be referred to as "secondary emulsifying agents." The partial replacement of primary emulsifying agent with secondary emulsifying agent advantageously permits the production of emulsions of increased alkyd resin content. However, use of excessive amounts of secondary emulsifying agent disadvantageously destroys freeze-thaw resistance of the emulsion.

At least about 3% by weight, based on the weight of the alkyd resin, of primary emulsifying agent must be present where secondary emulsifying agents are used as partial replacements for primary emulsifying agents. Combinations of primary and secondary emulsifying agents comprising about 3% and about 2% respectively, and about 5% and about 2% respectively, by weight, based on the weight of the alkyd resin are particularly useful as the emulsifying agents component of this invention.

Water-soluble basic materials may advantageously be used in the compositions of this invention to adjust the pH to about 8 to 10.

Suitable water-soluble basic materials include ammonium hydroxide, tetramethyl ammonium hydroxide, morpholine, sodium hydroxide, lithium hydroxide, sodium carbonate and the like.

Suitable driers which may be used to impart rapid air-drying properties to the composition of this invention include conventional driers, such as naphthenoic and stearic acid salts of cobalt, manganese, lead and vanadium.

Thickening agents may advantageously be used in the composition of this invention, such as "Modicol VR," which is a sodium salt of a polyacrylate.

In addition, pigments, opacifying agents, fire-retardants, light stabilizers and other such materials conventionally used in coating compositions may be used in the compositions of this invention.

To prepare water-based coating compositions of this invention, alkyd resins are emulsified to give oil-in-water emulsions of resin contents of from about 35 to 60%, preferably from about 55 to 60% by weight, based on the weight of the total composition.

The components of the compositions of this invention may be combined in any suitable conventional manner to obtain oil-in-water emulsion of particle sizes in the range of about 0.5 to 30 microns preferably about 0.5 to 12 microns. For example, the alkyd resin may be blended with the emulsifying agent and then stirred with heating into the water charge preferably at an adusted pH to form a coarse emulsion which may be passed through a colloid mill to produce an emulsion having the alkyd resin particles reduced to the desired size range. Driers, pigments, etc. may be added directly to the emulsion or blended with an emulsifying agent before addition to the emulsion. If desired all or portions of the non-aqueous components may be blended together before addition to water.

The following examples illustrate in detail the preparation of the alkyd resins of this invention and air-drying water-based coating compositions containing such alkyd resins in accordance with this invention, and also, for purposes of comparison, certain compositions which do not fall within the scope of the invention.

All viscosities referred to herein were determined at 70% by weight in xylene by the Gardner Bubble viscometer.

All percentages given in the examples are percent by weight.

The term "percent solids" used in connection with emulsions refers to the percent by weight, based on the total weight of the emulsion, represented by the combined weights of alkyd resin and emulsifying agent.

Ammonium hydroxide having about 28% to about 30% $NH_3$ by weight is referred to hereinafter as "$NH_4OH$."

The examples are merely illustrative and this invention is not intended to be confined to any limitation contained therein.

Example I

To a kettle provided with a stirrer was added 281.25 parts of alkali-refined soya bean oil. While bubbling a continuous stream of inert gas through the oil the temperature was raised to 180° C., at which temperature 1.62 parts of 4% calcium naphthenate and 56.25 parts of pentaerythritol were added and the temperature then increased to 230 to 240° C. and held until a mixture of 1 part product and 1½ parts of methyl alcohol showed no insolubility (about 1 hour). The temperature was then lowered to 180° C. at which time 108 parts phthalic anhydride and 3.15 parts maleic anhydride were added. The temperature was gradually raised to 238° C. and held at this temperature until an acid number of 2.5 or less an a viscosity of $Z_1$ to $Z_3$ (70% in xylene) was obtained. In order to achieve this, it was necessary to control the flow of inert gas. For a charge of 450 lbs., the inert gas flow was 1.1 to 1.4 cubic feet per minute until an acid number of 4.1 and a viscosity of Y was obtained. At this point, inert gas flow was increased to 3.2 cubic feet per minute and held until an acid number of 2.4 and a viscosity of $Z_1$ (70% in xylene, Gardner Bubble Viscometer) was obtained.

To prepare an emulsion 100 parts of the alkyd resin was cooled to 180° C. To it was added 5 parts "Igepal" CO-880, (a nonylphenol-ethylene oxide condensate having an average of about 30 mols of ethylene oxide) and 2 parts "Igepal" CTA-639, (an alkyl phenolethylene oxide condensate) and mixed. This mixture was then quickly added to a mixture of 70.2 parts deionized water and 1.5 parts $NH_4OH$ in a vessel having cooling means and condenser, at about 80 to 90° C., with high speed stirring. This emulsion was then passed through an Eppenbach Colloid Mill with the narrowest possible opening (set at 0 to 1) and temperature at bottom of hopper maintained at about 70 to 80° C. The emulsion was cooled and filtered through 6 ply cheese cloth before use. Particle size as determined by microscope averaged 7 to 8 microns. Final solids of the emulsion was 60.9%, viscosity 61.7 Krebs Units and pH of 9.7. The emulsion passed over 5 cycles in the freeze-thaw test, (1 cycle=16 hours at 10° F. and 8 hours at room temperature). Dry time of films cast from the emulsion containing driers (0.04% cobalt metal, added as cobalt naphthenate emulsified with "Igepal" CTA-639 and 0.4% lead metal based on the weight of the alkyd resin, added as lead naphthenate emulsified with "Igepal" CTA-639) with a 2 mil Doctor blade was 3 to 4 hours. Pencil hardness of seven day old clear film was H. Scrub resistance of 24 hour dried clear film was excellent, passing over 5000 cycles without any macroscopically observable wear.

Flat wall paints prepared from this emulsion and containing driers (0.3% cobalt metal and 0.06% manganese metal, based on the weight of the alkyd resin, added as "Witco" Emulsive Driers) dried to touch in 15 minutes and through-dried within 24 hours as evidenced by the excellent scrub resistance, passing 5000 cycles without any macroscopically observable wear.

Example II

To a kettle provided with a stirrer was added 258.5 parts of tall oil fatty acids. While bubbling a continuous stream of inert gas through the mixture the temperature was raised to 180° C. at which temperature 103.7 parts phthalic anhydride, 87.1 parts pentaerythritol and 0.68 part maleic anhydride were added, and the temperature then increased to 238° C. and held at this temperature until an acid number of 2.3 or less and a viscosity of V (70% in xylene) was obtained. In order to obtain this acid number it was necessary to control the inert gas flow. For a charge of 450 lbs., the inert gas flow was 1.1 cubic feet per minute until an acid number of 8.3 and a viscosity of S (70% in xylene) was obtained. Inert gas flow was then increased to 3.2 cubic feet per minute and held until an acid number of 2.3 and a viscosity of V (70% in xylene, Gardner Bubble Viscometer) was obtained.

To prepare an emulsion 100 parts of the alkyd resin was cooled to 180° C. To it was added 3 parts "Igepal" CO-880 and 2 parts "Igepal" CTA-639 and mixed. This was then added quickly to a mixture of 111.3 parts deionized water, 1.2 parts $NH_4OH$ and 3 parts of Modicol VR (25% aqueous solution) which was heated to 70 to 80° C., with high speed stirring. This emulsion was then passed through an Eppenbach Colloid Mill with the opening set at 0 to 1 and the temperature at the bottom of the hopper maintained at about 70 to 80° C. After cooling to room temperature the emulsion was passed through 6 ply of cheese cloth. Particle size as determined by microscope averaged 4 microns. Final solids of the emulsion was 48.4%, viscosity 77 Krebs Units and pH of 9.8. The emulsion containing driers (0.04% cobalt metal and 0.4% lead metal, based on the weight of the alkyd resin) with a 3 mil Doctor blade dried within 4 hours. Seven day old films possessed a pencil hardness of B.

Example III

This example illustrates the unsuitability of a fast-drying oil as complete replacement for the slow-drying oil.

In a manner similar to that described in Example I, 500 parts of alkali-refined linseed oil was heated to 180° C. while bubbling inert gas. At this temperature 100 parts penetaerythritol and 2 parts calcium naphthenate (5% metal) were added and the temperature then increased to 230 to 240° C. and held until a mixture of 1 part product and 1½ parts methyl alcohol showed no insolubility (about 15 minutes). The temperature was then lowered to 180° C. at which time 192 parts phthalic anhydride and 5.2 parts maleic anhydride were added. The temperature was gradually raised to 238° C. and held until an acid number of 2.3 was obtained. The rate of inert gas flow used throughout was 0.35 cubic feet/hour for a 800 gram charge. Viscosity of the resin was U (70% in xylene) (Gardner Bubble Viscometer).

In a manner similar to that described in Example I, 100 parts of above the alkyd resin, 5 parts "Igepal" CO–880 and 2 parts "Igepal" CTA–639 were mixed at 80 to 90° C. This mixture was added with stirring to a mixture of 70.5 deionized water and 1.5 parts NH$_4$OH which was heated to 70–80° C. This was then passed through an Eppenbach Colloid mill as mentioned in Example I. The 60% emulsion had a viscosity of 56 Krebs Units and a pH of 10.1. The emulsion failed the freeze-thaw test after 3 cycles.

Example IV

An alkyd resin of the same formula as that in Example III was prepared except that half of the linseed oil was replaced by soya bean oil. The procedure of Example I was followed except that a higher rate of inert gas flow was required to decrease the acid number. Final acid number of the resin was 2.5 and the viscosity $Z_2$ (70% in xylene).

In a manner similar to that described in Example I, 100 parts of the alkyd resin, 5 parts "Igepal" CO–880, 2 parts "Igepal" CTA–639, 70.5 parts deionized water and 1.5 parts NH$_4$OH were mixed and emulsified. The 60% solids emulsion had a viscosity of 58 Krebs Units and a pH of 9.6. The emulsion passed 5 freeze-thaw cycles.

Example V

Following the formulation and procedure of Example I, except that 10% of soya bean oil was replaced by dehydrated castor oil, an alkyd resin with acid number of 1.85 and a viscosity of $Z_2$ (70% in xylene, Gardner Bubble Viscometer) was obtained. In a manner similar to that described in Example I a 60% emulsion was prepared with 100 parts of the resin, 5 parts "Igepal" CO–880, 2 parts "Igepal" CTA–639, 70.5 parts deionized water and 1.5 parts NH$_4$OH passed 5 freeze-thaw cycles.

Example VI

Following the formulation and procedure of Example I, except that 5% of the soya bean oil was replaced by tung oil, an alkyd resin with acid number of 2.0 and a viscosity of Z (70% in xylene, Gardner Bubble Viscometer) was obtained. In a manner similar to that described in Example I, a 60% emulsion was prepared from 100 parts of the resin, 5 parts "Igepal" CO–880, 2 parts "Igepal" CTA–639, 70.5 parts deionized water and 1.5 parts NH$_4$OH passed 5 freeze-thaw cycles.

Example VII

In a manner similar to that described in Example II, 453.2 parts soya bean fatty acid and 99.6 parts of isophthalic acid was heated to 180° C. while bubbling inert gas through the mixture. At this temperature 99.9 parts pentaerythritol was added and the temperature then increased to 260° C. and held until acid number of 2.6 was obtained. Rate of inert gas flow was used throughout was 0.25 cubic foot per hour per 650 grams of charge.

A procedure similar to that described in Example I was used to prepare an emulsion. To 300 parts of above resin was added 15 parts "Igepal" CO–880 and 6 parts "Igepal" CTA–639. The ingredients were heated to 80 to 90° C. and mixed. This was then added with stirring to a mixture of 232 parts deionized water and 3 parts NH$_4$OH which was warmed to 70° C. After passing through the Eppenbach Colloid mill at 70 to 80° C., and filtering on cooling, the emulsion was then tested. The emulsion at 60.6% solids had a viscosity of 62 Krebs Units at a pH of 9.3. The emulsion passed 5 freeze-thaw cycles. Emulsion containing driers (0.04% cobalt and 0.4% lead, based on the weight of the resin) required 5 hours to dry (2 mils wet). Seven day old film had a pencil hardness of B. Twenty-four hour dried clear film passed 5000 cycles in the scrub test.

Example VIII

In a manner similar to that described in Example I and using same formulation, resins having varying acid numbers were prepared. These resins had acid numbers of 7.0, 4.9, 4.2, 4.15, 3.75, 3.3, 2.8, and 2.4. In a manner similar to that described in Example I, 60% emulsion samples were prepared from 100 parts of the respective resin, 5 parts "Igepal" CO–880, 2 parts CTA–639, 70.5 parts deionized water and 1.5 parts NH$_4$OH. Emulsions from resins having acid numbers of 7.0, 4.9, 4.2, 4.15 and 3.75 failed to pass 5 cycles in the freeze-thaw test. The remaining emulsions passed 5 cycles in the freeze-thaw test.

Example IX

In a manner similar to that described in Example I, resins were prepared having varying hydroxyl numbers by varying the phthalic anhydride content and keeping other components in the formulation constant. The resins had acid numbers of about 1.5 to about 2.0. The phthalic anhydride contents of the resins made were 24.0, 23.0, 22.2 and 20.2% by weight, based on the total weight of the reactants. Hydroxyl numbers of the resins were 32, 36.5, 44.5 and 62.3, respectively. In a manner similar to that described in Example I, 60% emulsion samples were prepared with 100 parts of the respective resin, 5 parts "Igepal" CO–880, 2 parts "Igepal" CTA–639, 70.5 parts deionized water and 1.5 parts NH$_4$OH. The emulsion samples were tested for freeze-thaw resistance. An emulsion prepared from a resin having a hydroxyl number of 62.3 failed first freeze-thaw cycle. The other emulsions all passed 5 cycles.

Example X

A soya bean oil modified alkyd resin was prepared in a manner similar to that described in Example I. Samples of emulsions were prepared following the procedure described in Example I, using "Igepal" DM–880 (dinonyl phenol-ethylene oxide condensate having an average of about 30 mols of ethylene oxide), as the sole emulsifying agent in varying amounts to obtain samples having nonionic emulsifying agent contents of 1, 3, 5, 7, 9, 11, 13 and 15%, by weight based on the weight of the resin. On subjecting to freeze-thaw tests, the samples containing 1% and 3% emulsifying agent failed the first cycle. The remaining samples passed 5 cycles. All the samples formed air-drying films, however the films of the samples having 11% to 15% emulsifying agent were undesirably soft, had heavy spewing and long drying times.

Example XI

Two soya bean oil-modified alkyd resin samples were prepared by a procedure similar to that described in Example I, except that the sole emulsifying agent used in each was 7% by weight based on the weight of the resin, of "Hyonic" PE–200 and "Hyonic" PE–300 (octylphenol-ethylene oxide condensates having an average of about 20 and about 30 mols of ethylene oxide, respectively). Both emulsions gave satisfactory air-drying films and passed 5 freeze-thaw cycles.

Example XII

Soya bean oil-modified alkyd resins were prepared following formulations and procedures similar to those of Example I. Emulsion samples were prepared in a manner similar to that described in Example I using various nonionic materials as primary emulsifying agents. The emulsion samples were tested for freeze-thaw resistance. Data are given in Table I. This example illustrates the unsuitability of various nonionic materials as the primary emulsifying agents of this invention. Proportions given in the table are in grams, unless specified otherwise.

TABLE I.—TESTS OF NONIONIC EMULSIFYING AGENTS AS PRIMARY EMULSIFYING AGENTS

|  | No. 1 | No. 2 | No. 3 | No. 4 | No. 5 |
|---|---|---|---|---|---|
| Alkyd Resin | 200 | 200 | 200 | 200 | 200 |
| Water | (6) | 239.1 | 235 | 239.1 | 239.1 |
| NH4OH | 4 | 2.4 | 2.4 | 2.4 | 2.4 |
| Nonionic Emulsifying Agent: |  |  |  |  |  |
| Octylphenol-ethylene oxide condensate (about 3 mols ethylene oxide)[1] | 14 |  |  |  |  |
| Octylpenol-ethylene oxide condensate (about 9 to 10 mols ethylene oxide)[2] |  | 14 |  |  |  |
| Alkylphenol-ethylene oxide condensate (about 60% ethylene oxide)[3] |  |  | 14 |  |  |
| Nonylpenol-ethylene oxide condensate (about 15 mols ethylene oxide)[4] |  |  |  | 14 |  |
| Nonylphenol-ethylene oxide condensate (about 20 mols ethylene oxide)[5] |  |  |  |  | 14 |
| Percent Emulsify agent, based on weight of resin | 7 | 7 | 7 | 7 | 7 |
| Freeze-thaw Test: 5 cycles | (7) | (7) | (7) | (7) | (7) |

[1] Trade name "Hyonic" PE-30.
[2] Trade name "Igepal" CA-630.
[3] Trade name "Igepal" CTA-639.
[4] Trade name "Igepal" CO-730.
[5] Trade name "Igepal" CO-850.
[6] About 140, adjusted to about 60% solids.
[7] Failed.

TABLE II.—TESTS OF NONIONIC EMULSIFYING AGENTS AS PRIMARY EMULSIFYING AGENTS

|  | No. 1 | No. 2 | No. 3 | No. 4 | No. 5 |
|---|---|---|---|---|---|
| Alkyd Resin | 200 | 100 | 100 | 100 | 100 |
| Water | 232.5 | 105.5 | 105.5 | 129.5 | 105.5 |
| NH4OH | 2.5 | 1.5 | 1.5 | 1.5 | 1.5 |
| Nonionic Emulsifying Agent: |  |  |  |  |  |
| Ethylene oxide-propylene glycol condensate[1] | 14 |  |  |  |  |
| Alkylpoly (ethyleneoxy) glycol amine[2] |  | 7 |  |  |  |
| Castor Oil-ethylene oxide condensate[3] |  |  | 7 |  |  |
| Tallow alcohol-ethylene oxide condensate[4] |  |  |  | 7 |  |
| Polyethylene glycol laurate[5] |  |  |  |  | 7 |
| Percent Emulsifying agent, based on weight of resin | 7 | 7 | 7 | 7 | 7 |
| Freeze-thaw Test: 5 cycles | (6) | (6) | (6) | (6) | (6) |

[1] Trade name "Pluronic" P-75.
[2] Trade name "Antarox" G-100.
[3] Trade name "Surfactol" 340.
[4] Trade name "Emulphogene" AM-870.
[5] Trade name "Nopcol" Glycol 400
[6] Failed.

Example XIV

Following the procedure similar to that of Example XII emulsion samples were prepared in which part of the primary emulsifying agent was replaced by a secondary emulsifying agent or another primary emulsifying agent. Data are given in Table III. Proportions are in grams, unless specified otherwise.

TABLE III.—TESTS OF PARTIAL REPLACEMENT OF PRIMARY BY SECONDARY EMULSIFYING AGENTS

|  | No. 1 | No. 2 | No. 3 | No. 4 | No. 5 | No. 6 |
|---|---|---|---|---|---|---|
| Alkyd Resin | 150 | 150 | 100 | 100 | 100 | 100 |
| Water | 179.7 | 179.7 | 105.5 | 105.5 | 105.5 | 105.5 |
| NH4OH | 1.8 | 1.8 | 1.5 | 1.5 | 1.5 | 1.5 |
| Primary Emulsifying Agent: |  |  |  |  |  |  |
| "Igepal" DM-880 | 7.5 | 7.5 | 5 | 5 | 5 | 5 |
| "Igepal" CO-880 | 3 |  |  |  |  |  |
| Secondary Emulsifying Agent: |  |  |  |  |  |  |
| "Igepal" CA-630 |  | 3 |  |  |  |  |
| "Antarox" G-100 |  |  | 2 |  |  |  |
| "Surfactol" 340 |  |  |  | 2 |  |  |
| "Emulphogene" AM-870 |  |  |  |  | 2 |  |
| "Nopcol" Glycol 400 |  |  |  |  |  | 2 |
| Percent Total Emulsifying Agent, based on weight of resin | 7 | 7 | 7 | 7 | 7 | 7 |
| Ratio of Primary to Secondary Emulsifying Agent | 5:2 | 5:2 | 5:2 | 5:2 | 5:2 | 5:2 |
| Freeze-thaw Test: 5 cycles | (1) | (1) | (1) | (1) | (1) | (1) |

[1] Passed.

Example XIII

Following a procedure similar to that of Example XII, emulsion samples were prepared using various nonionic alkylphenol-ethylene oxide condensates as primary emulsifying agents. Data are given in Table II. This example illustrates the unsuitability of various nonionic materials as the primary emulsifying agents of this invention. Proportions given in the table are in grams, unless specified otherwise.

Example XV

Following a procedure similar to that of Example XII emulsion samples were prepared in which the primary emulsifying agent was replaced by increasing amounts of secondary emulsifying agent. Data are given in Table IV. This example illustrates that primary emulsifying agent, except for about 3% by weight, based on the weight of the resin, may be advantageously replaced by secondary emulsifying agent. Proportions given in the table are in grams, unless specified otherwise.

TABLE IV.—TESTS OF VARIOUS RATIOS OF PRIMARY AND SECONDARY EMULSIFYING AGENTS

|  | No. 1 | No. 2 | No. 3 | No. 4 | No. 5 | No. 6 |
|---|---|---|---|---|---|---|
| Alkyd Resin | 150 | 150 | 150 | 150 | 150 | 150 |
| Water | 180 | 180 | 180 | 180 | 180 | 180 |
| NH4OH | 1.8 | 1.8 | 1.8 | 1.8 | 1.8 | 1.8 |
| Primary Emulsifying Agent [1] | 9.0 | 7.5 | 6.0 | 4.5 | 3.0 | 1.5 |
| Secondary Emulsifying Agent [2] | 1.5 | 3.0 | 4.5 | 6.0 | 7.5 | 9 |
| Percent Total Emulsifying Agent based on weight of resin | 7 | 7 | 7 | 7 | 7 | 7 |
| Ratio of Primary to Secondary Emulsifying Agent | 6:1 | 5:2 | 4:3 | 3:4 | 2:5 | 1:6 |
| Freeze-thaw Test: Cycles passed | 5 | 5 | 5 | 5 | (3) | (3) |

[1] "Igepal" DM-880.
[2] "Igepal" CTA-639.
[3] None.

Example XVI

Tall oil-modified alkyd resins were prepared following a formulation and procedure similar to that of Example II. Emulsion samples were prepared in a manner similar to that described in Example I, using various materials as emulsifying agent components. Data are given in Table V. This example further illustrates the invention. Proportions given in the table are in grams, unless specified otherwise.

TABLE V.—TESTS OF TALL OIL-MODIFIED ALKYD RESIN EMULSIONS

|  | No. 1 | No. 2 | No. 3 | No. 4 |
|---|---|---|---|---|
| Alkyd Resin | 200 | 200 | 200 | 200 |
| Water | 240 | 234 | 237 | 240 |
| NH₄OH | 2.4 | 2.4 | 2.4 | 2.4 |
| Primary Emulsifying Agent |  |  |  |  |
| "Igepal" CO-880 | 14 |  |  |  |
| "Igepal" DM-880 |  | 6 | 8 | 10 |
| Second Emulsifying Agent; "Igepal" CTA-639 |  | 4 | 4 | 4 |
| Percent Total Emulsifying Agent, based on weight of resin | 7 | 5 | 6 | 7 |
| Ratio of Primary to Secondary Emulsifying Agent |  | 3:2 | 4:2 | 5:2 |
| Freeze-thaw Test: 5 cycles | (¹) | (¹) | (¹) | (¹) |

¹ Passed.

I claim:
1. A water-dispersible composition comprising:
   (a) an oil-modified alkyd resin having an acid number no greater than about 3.5 and a hydroxyl number of from about 30 to 45, the oil modifier being composed predominantly of slow drying constituents selected from the group consisting of soya bean oil, soya bean oil fatty acids and tall oil fatty acids, and
   (b) from about 5 to 9% by weight, based on the component in which at least about 3% by weight, componen in which at least about 3% by weight, based on the weight of the resin, comprises a member of the group consisting of
      nonylphenol-ethylene oxide condensate having an average of at least about 30 mols of ethylene oxide,
      dinonylphenol-ethylene oxide condensate having an average of at least about 30 mols of ethylene oxide, and
      octylphenol-ethylene oxide condensate having an average of at least about 20 mols of ethylene oxide
   and mixtures thereof.

2. A water-dispersible composition as specified in claim 1 in which the resin is an esterification product of:
   (a) phthalic anhydride,
   (b) maleic anhydride,
   (c) pentaerythritol partial esters of soya bean oil fatty acids, and
   (d) glycerol partial esters of soya bean oil fatty acids.

3. A water-dispersible composition as specified in claim 1 in which the resin is an esterification product of:
   (a) phthalic anhydride,
   (b) maleic anhydride,
   (c) pentaerythritol, and
   (d) tall oil fatty acids.

4. A water-dispersible composition as specified in claim 1 in which the resin is an esterification product of:
   (a) phthalic anhydride,
   (b) maleic anhydride,
   (c) pentaerythritol, and
   (d) soya bean oil fatty acids.

5. A water-dispersible composition as specified in claim 1 in which the resin is an esterification product of:
   (a) isophthalic acid,
   (b) pentaerythritol, and
   (c) soya bean oil fatty acids.

6. A water-dispersible composition as specified in claim 1 in which the resin is an esterification product of:
   (a) a compound selected from the group consisting of phthalic acid, phthalic anhydride and mixtures of phthalic anhydride and maleic anhydride,
   (b) a compound selected from the group consisting of soya bean oil, soya bean oil fatty acids and mixtures of soya bean oil and linseed oil, mixtures of soya bean oil and tung oil, and mixtures of soya bean oil and dehydrated castor oil, and
   (c) pentaerythritol.

7. A water-dispersible composition as specified in claim 1 in which the resin is the esterification product of:
   (a) from about 60 to 70 parts of soya bean oil
   (b) from about 20 to 28 parts of phthalic anhydride
   (c) up to about 1 part of maleic anhydride and
   (d) from about 9 to 14 parts of pentaerythritol.

8. A water-dispersible composition as specified in claim 1 in which the resin is the esterification product of:
   (a) from about 55 to 65 parts of tall oil fatty acids
   (b) from about 16 to 25 parts of phthalic anhydride
   (c) up to about 0.3 part of maleic anhydride and
   (d) from about 16 to 22 parts of pentaerythritol.

9. A water-dispersible composition comprising:
   (a) an oil-modified alkyd resin having an acid number no greater than about 3.5 and a hydroxyl number of from about 30 to 45, the oil modifier being composed predominantly of slow drying constituents selected from the group consisting of soya bean oil, soya bean oil fatty acids and tall oil fatty acids, and
   (b) from about 5 to 9% by weight, based on the weight of the resin, of a nonionic emulsifying agent component in which at least about 3% by weight, based on the weight of the resin, comprises nonylphenol-ethylene oxide condensate having an average of at least about 30 mols of ethylene oxide.

10. A water-dispersible composition comprising:
    (a) an oil-modified alkyd resin having an acid number no greater than about 3.5 and a hydroxyl number of from about 30 to 45, the oil modifier being composed predominantly of slow drying constituents selected from the group consisting of soya bean oil, soya bean oil fatty acids and tall oil fatty acids, and
    (b) from about 5 to 9% by weight, based on the weight of the resin, of a nonionic emulsifying agent component in which at least about 3% by weight, based on the weight of the resin, comprises dinonylphenol-ethylene oxide condensate having an average of at least about 30 mols of ethylene oxide.

11. A water-dispersible composition comprising:
    (a) an oil-modified alkyd resin having an acid number no greater than about 3.5 and a hydroxyl number of from about 30 to 45, the oil modifier being composed predominately of slow drying constituents selected from the group consisting of soya bean oil, soya bean oil fatty acids and tall oil fatty acids, and
    (b) from about 5 to 9% by weight, based on the weight of the resin, of a nonionic emulsifying agent component in which at least about 3% by weight, based on the weight of the resin, comprises dionylphenol-ethylethylene oxide condensate having an average of at least about 20 mols of ethylene oxide.

12. An aqueous emulsion suitable for use as an air-drying surface coating material comprising:
    (a) from about 40 to 65 parts of water,
    (b) from about 35 to 60 parts of long oil alkyd resin containing, as essential constituents, residues of acid radicals of soya bean oil and acid radicals of dicarboxylic acid anhydrides, combined with residues of glycerol and pentaerythritol, and (c) from about 5 to 9% by weight, based on the weight of the resin, of a ninionic emulsifying agent component in which at least about 3% by weight based on the weight of the resin, comprises a member of the group consisting of nonylphenol-ethylene oxide condensate having an average of at least about 30 mols of ethylene oxide, dinonylphenol-ethylene oxide condensate having an average of at least about 30 mols of ethylene oxide, and octylphenol-ethylene oxide condensate having an average of at least about 20 mols of ethylene oxide and mixtures thereof, said resin having an acid number no greater than about 3.5 and a hydroxyl number of from about 30 to about 45.

13. An aqueous emulsion suitable for use as an air-drying surface coating material comprising:
(a) from about 40 to 65 parts of water,
(b) from about 35 to 60 parts of long oil alkyd resin containing as essential constituents, residues of tall oil fatty acids, pentaerythritol and dicarboxylic acid anhydrides, and
(c) from about 5 to 9% by weight, based on the weight of the resin, of a nonionic emulsifying agent component in which at least 3% by weight, based on the weight of the resin, comprises a member of the group consisting of nonylphenol-ethylene oxide condensate having an average of at least about 30 mols of ethylene oxide, dinonylphenol-ethylene oxide condensate having an average of at least about 30 mols of ethylene oxide, and octylphenol-ethylene oxide condensate having an average of at least about 20 mols of ethylene oxide, and mixtures thereof, said resin having an acid number no greater than about 3.5 and a hydroxyl number of from about 30 to 45.

14. A composition comprising:
(a) 100 parts of a long oil alkyd resin having an acid number of about 1.5 to 3.5 and a hydroxyl number of from about 30 to 45 which is the esterification product of
(1) about 63 parts by weight of soya bean oil,
(2) about 12.5 parts of pentaerythritol,
(3) about 24 parts of phthalic anhydride and
(4) up to about 1 part of maleic anhydride and
(b) from about 5 to 7 parts of nonylphenolethylene oxide condensate having an average of about 30 mols of ethylene oxide.

15. A composition comprising:
(a) 100 parts of a long oil alkyd resin having an acid number of about 1.5 to 3.5 and a hydroxyl number of from about 30 to 45 which is the esterification product of
(1) from about 63 parts by weight of soya bean oil,
(2) about 12.5 parts of pentaerythritol,
(3) about 24 parts of phthalic anhydride and
(4) up to about 1 part of maleic anhydride and
(b) from about 5 to 7 parts of dinonylphenol ethylene oxide condensate having an average of about 30 mols of ethylene oxide.

16. A composition comprising:
(a) 100 parts of a long oil alkyd resin having an acid number of about 1.5 to 3.5 and a hydroxyl number of from about 30 to 45 which is the esterification product of
(1) about 58 parts of tall oil fatty acids
(2) from about 23 parts phthalic anhydride (3) up to about 0.2 part of maleic anhydride
(4) about 19 parts of pentaerythritol and
(b) from about 3 to 5 parts of nonylphenol ethylene oxide condensate having an average of about 30 mols of ethylene oxide and
(c) about 2 parts of alkylphenol-ethylene oxide condensate having about 60% by weight of ethylene oxide.

17. A composition comprising:
(a) 100 parts of a long oil alkyd resin having an acid number of about 1.5 to 3.5 and a hydroxyl number of from about 30 to 45 which is the esterification product of
(1) about 58 parts of tall oil fatty acids
(2) about 23 parts phthalic anhydride
(3) up to about 0.2 part of maleic anhydride
(4) about 19 parts of pentaerythritol and
(b) from about 3 to 5 parts of primary emulsifying agent component consisting of dinonylphenol-ethylene oxide condensate having an average of about 30 mols of ethylene oxide and
(c) about 2 parts of alkylphenol-ethylene oxide condensate having about 60% by weight of ethylene oxide.

18. The process of preparing an aqeous emulsion suitable for use as an air-drying coating material comprising mixing:
(a) from about 40 to 65 parts of water
(b) from about 35 to 60 parts of long oil alkyl resin having an acid number no greater than about 3.5, a hydroxyl number of from about 30 to 45, and containing, as essential constituents residues of acid radicals of soya bean oil and acid radicals of dicarboxylic acid anhydrides, combined with residues of glycerol and pentaerythritol, and
(c) from about 5 to 9% by weight, base on the weight of the resin, of a nonionic emulsifying agent component in which at least about 3% by weight, based on the weight of the resin, comprises of member of the group consisting of nonylphenol-ethylene oxide condensate having an average of at least about 30 moles of ethylene oxide, dinonylphenol-ethylene oxide condensate having an average of at least about 30 mols of ethylene oxide, and octylphenol-ethylene oxide condensate having an average of at least about 20 mols of ethylene oxide and mixtures thereof.

19. The process for preparing an aqueous emulsion suitable for use as an air-drying surface coating material comprising mixing:
(a) from about 40 to 65 parts of water,
(b) from about 35 to 60 parts of long oil alkyl resin having an acid number no greater than about 3.5, a hydroxyl number of from about 30 to 45 and containing as essential constituents residues of tall oil fatty acids, pentaerythritol and dicarboxylic acid anhydrides, and
(c) from about 5 to 9% by weight, base on the weight of the resin, of a nonionic emulsifying agent component in which at least 3% by weight, based on the weight of the resin, comprises a member of the group consisting of nonylphenol-ethylene oxide condensate having an average of at least about 30 moles of ethylene oxide, dinonylphenol-ethylene oxide condensate having an average of at least about 30 mols of ethylene oxide, and octylphenol-ethylene oxide condensate having an average of at least about 20 mols of ethylene oxide and mixtures thereof.

References Cited

UNITED STATES PATENTS

| | | |
|---|---|---|
| 3,243,393 | 3/1966 | Barton et al. _____ 260—33.2 |
| 3,269,967 | 8/1966 | Broadhead. |

OTHER REFERENCES

Schwartz et al.: Surface Active Agents and Detergents, vol. II, 1958, p. 125.

Zimmerman et al.: Supplement III to the 1953 Edition of Handbook of Material Trade Names, 1960, pp. 123 and 124.

DONALD E. CZAJA, *Primary Examiner.*

R. W. GRIFFIN, *Assistant Examiner.*

U.S. Cl. X.R.

117—167; 260—29.2, 32.4, 32.6, 33.2, 40

PO-1050
(5/69)

UNITED STATES PATENT OFFICE
CERTIFICATE OF CORRECTION

Patent No. 3,440,193                     Dated April 22, 1969

Inventor(s) Philip J. Campagna

It is certified that error appears in the above-identified patent and that said Letters Patent are hereby corrected as shown below:

Column 3, line 14, "resin" should be --rosin--.

Column 5, line 55, "an" should be --and--.

Column 7, line 62, "foot" should be --feet--.

Claim 1, column 11, line 42, delete "componen in which at least about 3% by weight,";

line 40, after "on the" insert --weight of the resin of a nonionic emulsifying agent--.

Claim 11, column 12, line 66, "dionylphenol-" should be --octylphenol- --.

Claim 18, column 14, line 29, "alkyl" should be --alkyd--;

line 36, "base" should be --based--;

line 39, "of" should be --a--.

Claim 19, column 14, line 50, "for" should be --of--;

line 54, "alkyl" should be --alkyd--;

line 60, "base" should be --based--.

SIGNED AND
SEALED
MAY 19 1970

(SEAL)
Attest:

Edward M. Fletcher, Jr.
Attesting Officer

WILLIAM E. SCHUYLER, JR.
Commissioner of Patents